US011232089B2

United States Patent
Varley et al.

(10) Patent No.: US 11,232,089 B2
(45) Date of Patent: *Jan. 25, 2022

(54) MULTI-MASTER DATA REPLICATION IN A DISTRIBUTED MULTI-TENANT SYSTEM

(71) Applicant: salesforce.com, inc., San Francisco, CA (US)

(72) Inventors: Ian Varley, Austin, TX (US); Scott Hansma, Burlingame, CA (US); Paul Burstein, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/566,613

(22) Filed: Sep. 10, 2019

(65) Prior Publication Data

US 2020/0004734 A1 Jan. 2, 2020

Related U.S. Application Data

(63) Continuation of application No. 15/198,411, filed on Jun. 30, 2016, now Pat. No. 10,459,908, which is a (Continued)

(51) Int. Cl.
*G06F 16/23* (2019.01)
*G06F 16/27* (2019.01)

(Continued)

(52) U.S. Cl.
CPC ...... *G06F 16/2322* (2019.01); *G06F 16/2379* (2019.01); *G06F 16/27* (2019.01);

(Continued)

(58) Field of Classification Search
CPC .. G06F 16/2322; G06F 16/27; G06F 16/2379; G06F 16/93; G06F 16/9535; G06F 16/954

(Continued)

(56) References Cited

U.S. PATENT DOCUMENTS 5,577,188 A 11/1996 Zhu
5,608,872 A 3/1997 Schwartz et al.

(Continued)

OTHER PUBLICATIONS

Final Office Action for U.S. Appl. No. 13/252,214 dated May 8, 2015, 15 pages.

(Continued)

*Primary Examiner* — Mark E Hershley
(74) *Attorney, Agent, or Firm* — Kwan & Olynick LLP

(57) ABSTRACT

A multi-master replication system is disclosed. The multi-master replication system allows a large set of peer instances to collaboratively replicate data to each other. According to an example, a change detection thread running on a first server associated with a first instance of multiple instances of a replicated database monitors for changes to any of multiple records within one or more shared tables of the replicated database. Responsive to detection of a change to a record, an item is stored by the change detection thread onto a queue containing information regarding the change. Groups of changes are packaged into multiple chunks, in which each chunk (i) corresponds to a discrete unit of progress for both change detection and transport; (ii) is associated with multiple changed records; (iii) contains metadata about the multiple changed records; and (iv) does not contain data from the one or more shared tables.

20 Claims, 12 Drawing Sheets

Related U.S. Application Data continuation of application No. 13/252,214, filed on Oct. 4, 2011, now Pat. No. 9,396,242.

(60) Provisional application No. 61/474,157, filed on Apr. 11, 2011.

(51) Int. Cl.
*G06F 16/93* (2019.01)
*G06F 16/954* (2019.01)
*G06F 16/9535* (2019.01)

(52) U.S. Cl.
CPC ............ *G06F 16/273* (2019.01); *G06F 16/93* (2019.01); *G06F 16/954* (2019.01); *G06F 16/9535* (2019.01)

(58) Field of Classification Search
USPC .......................................................... 707/614
See application file for complete search history.

(56) References Cited

U.S. PATENT DOCUMENTS 5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,317,754 B1 * 11/2001 Peng ...................... H04L 29/06 707/610
6,324,568 B1 11/2001 Diec
6,324,693 B1 11/2001 Brodersen et al.
6,336,137 B1 1/2002 Lee et al.
D454,139 S 3/2002 Feldcamp
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,532,479 B2 * 3/2003 Souder .................... G06F 16/27
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,704,737 B1 * 3/2004 Nixon .................... G06F 16/27 707/656
6,711,565 B1 3/2004 Subramaniam et al.
6,724,399 B1 4/2004 Katchour et al.
6,728,702 B1 4/2004 Subramaniam et al.
6,728,960 B1 4/2004 Loomans
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,371 B1 * 7/2004 Jandel .................... G06F 9/542 370/260
6,763,501 B1 7/2004 Zhu et al.
6,768,904 B2 7/2004 Kim
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker et al.
6,829,655 B1 12/2004 Huang et al.
6,842,748 B1 1/2005 Warner et al.
6,847,971 B1 * 1/2005 Balaraman .............. H04L 69/04
6,850,895 B2 2/2005 Brodersen et al.
6,850,949 B2 2/2005 Warner et al.
6,985,901 B1 * 1/2006 Sachse ................ H04L 41/5032
7,289,976 B2 10/2007 Kihneman et al.
7,340,411 B2 3/2008 Cook
7,349,960 B1 * 3/2008 Pothier .............. H04L 41/0806 709/224
7,620,655 B2 11/2009 Larsson et al.
7,627,658 B2 * 12/2009 Levett ...................... G06F 9/46 709/203
8,214,329 B2 * 7/2012 Gilder .................. G06F 16/254 707/622
8,296,398 B2 * 10/2012 Lacapra ............. H04L 67/1097 709/219
8,365,185 B2 * 1/2013 Bobak ..................... H04L 69/40 718/106
2001/0044791 A1 11/2001 Richter et al.
2002/0022986 A1 2/2002 Coker et al.
2002/0029161 A1 3/2002 Brodersen et al.
2002/0029376 A1 3/2002 Ambrose et al.
2002/0035577 A1 3/2002 Brodersen et al.
2002/0042264 A1 4/2002 Kim
2002/0042843 A1 4/2002 Diec
2002/0072951 A1 6/2002 Lee et al.
2002/0082892 A1 6/2002 Raffel et al.
2002/0095399 A1 * 7/2002 Devine ................ G06F 16/958
2002/0129352 A1 9/2002 Brodersen et al.
2002/0140731 A1 10/2002 Subramaniam et al.
2002/0143997 A1 10/2002 Huang et al.
2002/0152102 A1 10/2002 Brodersen et al.
2002/0161734 A1 10/2002 Stauber et al.
2002/0162090 A1 10/2002 Parnell et al.
2002/0165742 A1 11/2002 Robins
2003/0004971 A1 1/2003 Gong et al.
2003/0009431 A1 * 1/2003 Souder .................... G06F 16/27
2003/0018705 A1 1/2003 Chen et al.
2003/0018830 A1 1/2003 Chen et al.
2003/0066031 A1 4/2003 Laane
2003/0066032 A1 4/2003 Ramachadran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker
2003/0088545 A1 5/2003 Subramaniam et al.
2003/0101258 A1 * 5/2003 Parham .............. G06F 11/2097 709/224
2003/0120675 A1 6/2003 Stauber et al.
2003/0151633 A1 8/2003 George et al.
2003/0159136 A1 8/2003 Huang et al.
2003/0187921 A1 10/2003 Diec
2003/0189600 A1 10/2003 Gune et al.
2003/0191743 A1 10/2003 Brodersen et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan, Jr. et al.
2004/0199489 A1 10/2004 Barnes-Leon et al.

(56) References Cited

U.S. PATENT DOCUMENTS

2004/0199519 A1* 10/2004 Gu .................... G06F 16/24537
2004/0199536 A1 10/2004 Barnes-Leon et al.
2004/0199543 A1 10/2004 Braud et al.
2004/0221030 A1* 11/2004 Huras ................. G06F 16/2358 709/224
2004/0243591 A1* 12/2004 Gu ........................ G06F 16/283
2004/0249854 A1 12/2004 Barnes-Leon et al.
2004/0255023 A1* 12/2004 Motoyama ............ H04L 69/329 709/224
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0080765 A1* 4/2005 Dettinger .......... G06F 16/24549
2005/0091098 A1 4/2005 Brodersen et al.
2005/0193024 A1* 9/2005 Beyer ..................... G06F 16/20
2006/0047713 A1* 3/2006 Gornshtein ............. G06F 16/27
2006/0190497 A1* 8/2006 Inturi .................... G06F 16/213
2006/0200533 A1* 9/2006 Holenstein ............ G06F 16/273 709/208
2006/0212465 A1* 9/2006 Fish .................... G06F 11/2097
2006/0224479 A1* 10/2006 Bishop ................... G06Q 40/06 705/35
2007/0174815 A1* 7/2007 Chrysanthakopoulos .................. G06F 8/20 717/120
2007/0288526 A1* 12/2007 Mankad .............. G06F 11/1662
2007/0294319 A1* 12/2007 Mankad .............. G06F 11/1662
2008/0037420 A1* 2/2008 Tang ..................... H04L 1/1607 370/229
2008/0144601 A1* 6/2008 Nurminen ............... H04L 69/14 370/350
2008/0162728 A1* 7/2008 Robeal ................ H04L 67/1095 709/248
2008/0281846 A1* 11/2008 Hoang ................ G06F 16/2379
2008/0320019 A1* 12/2008 Bireley ................. G06F 16/221
2009/0164496 A1* 6/2009 Carnathan ........... G06F 16/2358
2009/0171707 A1* 7/2009 Bobak .............. G06Q 10/06313 705/7.23
2009/0177710 A1* 7/2009 Holenstein ............ G06F 16/273
2009/0177744 A1 7/2009 Marlow et al.
2009/0271283 A1* 10/2009 Fosnacht ............ G06Q 30/0601 705/26.1
2009/0299987 A1* 12/2009 Willson ................ G06F 16/254
2010/0020689 A1* 1/2010 Tang ....................... H04L 47/10 370/235
2010/0114821 A1* 5/2010 Schine .................. G06F 16/275 707/623
2010/0179940 A1* 7/2010 Gilder ................... G06F 16/258 707/622
2011/0047230 A1* 2/2011 McGee ................... H04L 43/10 709/206
2011/0071980 A1* 3/2011 Patterson .............. G06F 3/0611 707/626
2011/0153568 A1* 6/2011 Shang ..................... G06F 16/27 707/648
2011/0161339 A1* 6/2011 Ireland .................. G06F 16/273 707/759
2011/0225482 A1* 9/2011 Chan ..................... G06F 40/169 715/207
2011/0289508 A1* 11/2011 Fell ..................... H04L 67/1004 718/105
2012/0150791 A1* 6/2012 Willson ................ G06F 16/254 707/600
2012/0254175 A1* 10/2012 Horowitz .............. G06F 16/278 707/737

OTHER PUBLICATIONS

Final Office Action for U.S. Appl. No. 15/198,411 dated Dec. 27, 2018, 17 pages.
Final Office Action for U.S. Appl. No. 15/198,411 dated Nov. 2, 2017, 13 pages.
Non-Final Office Action for U.S. Appl. No. 13/252,214 dated Sep. 10, 2015, 15 pages.
Non-Final Office Action for U.S. Appl. No. 15/198,411 dated Mar. 8, 2017, 12 pages.
Non-Final Office Action for U.S. Appl. No. 15/198,411 dated May 16, 2018, 13 pages.
Notice of Allowance for U.S. Appl. No. 13/252,214 dated Mar. 11, 2016, 8 pages.
Notice of Allowance for U.S. Appl. No. 15/198,411 dated Jul. 31, 2019, 8 pages.

* cited by examiner

FIG.3

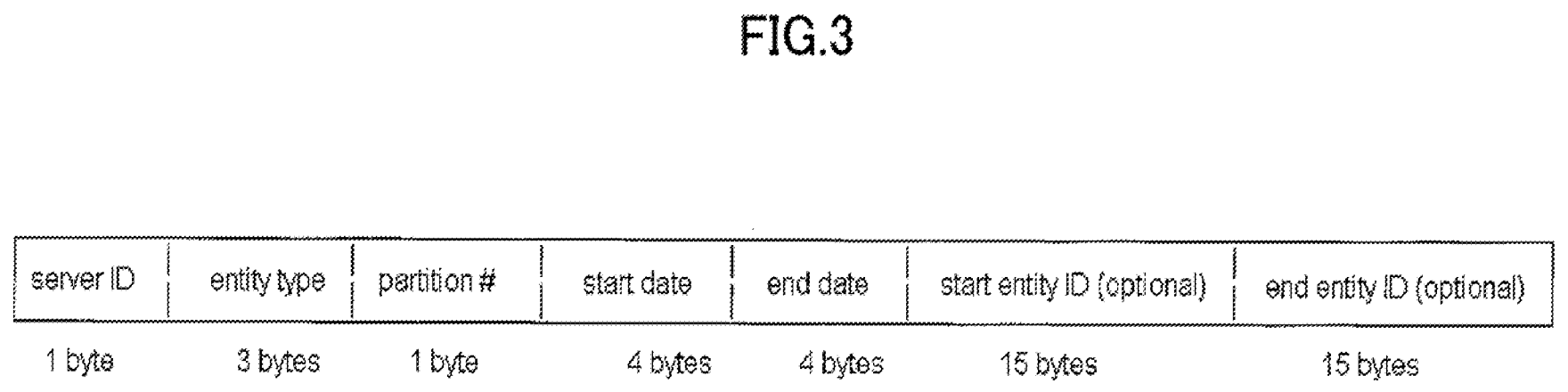

| server ID | entity type | partition # | start date | end date | start entity ID (optional) | end entity ID (optional) |
|---|---|---|---|---|---|---|
| 1 byte | 3 bytes | 1 byte | 4 bytes | 4 bytes | 15 bytes | 15 bytes |

Before compaction:

After compaction:

1122
1123
Tenant Space
1212
1124
Sys. DB
1125
Tenant Data
1214
Application MetaData
1216
Tenant DB
Application Setup Mechanism 1238
Save Routines 1236
PL/SOQL 1234
1118
Tenant Management Process 1210
System Process 1202
1116
Tenant 1 Process
Tenant 2 Process
Tenant N Process
1204
1128
API 1232
UI 1230
Appl. Server
$1200_1$
Appl. Server
$1200_N$
Environment 1110
Network 1114
1112
Processor System 1112A
Memory System 1112B
Input System 1112C
Output System 1112D
1112
1112

MULTI-MASTER DATA REPLICATION IN A DISTRIBUTED MULTI-TENANT SYSTEM

CLAIM OF PRIORITY

This patent application is a continuation of U.S. patent application Ser. No. 15/198,411, filed Jun. 30, 2016, which is a continuation of U.S. patent application Ser. No. 13/252,214, filed Oct. 4, 2011, which is claims the benefit of priority to U.S. Provisional Application No. 61/474,157, filed Apr. 11, 2011. All of the foregoing applications are hereby incorporated by reference in their entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

One or more implementations relate generally to replication in a multi-tenant database system in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid, secure, and efficient retrieval of accurate information and subsequent delivery of this information to the user system has been and continues to be a goal of administrators of database systems.

Unfortunately, conventional database approaches sometimes have difficulty with replication, and with processing updates to database tables.

Accordingly, it is desirable to provide techniques enabling improved replication within a database system.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 shows an example arrangement of chunk metadata;

DETAILED DESCRIPTION

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Figure 11:
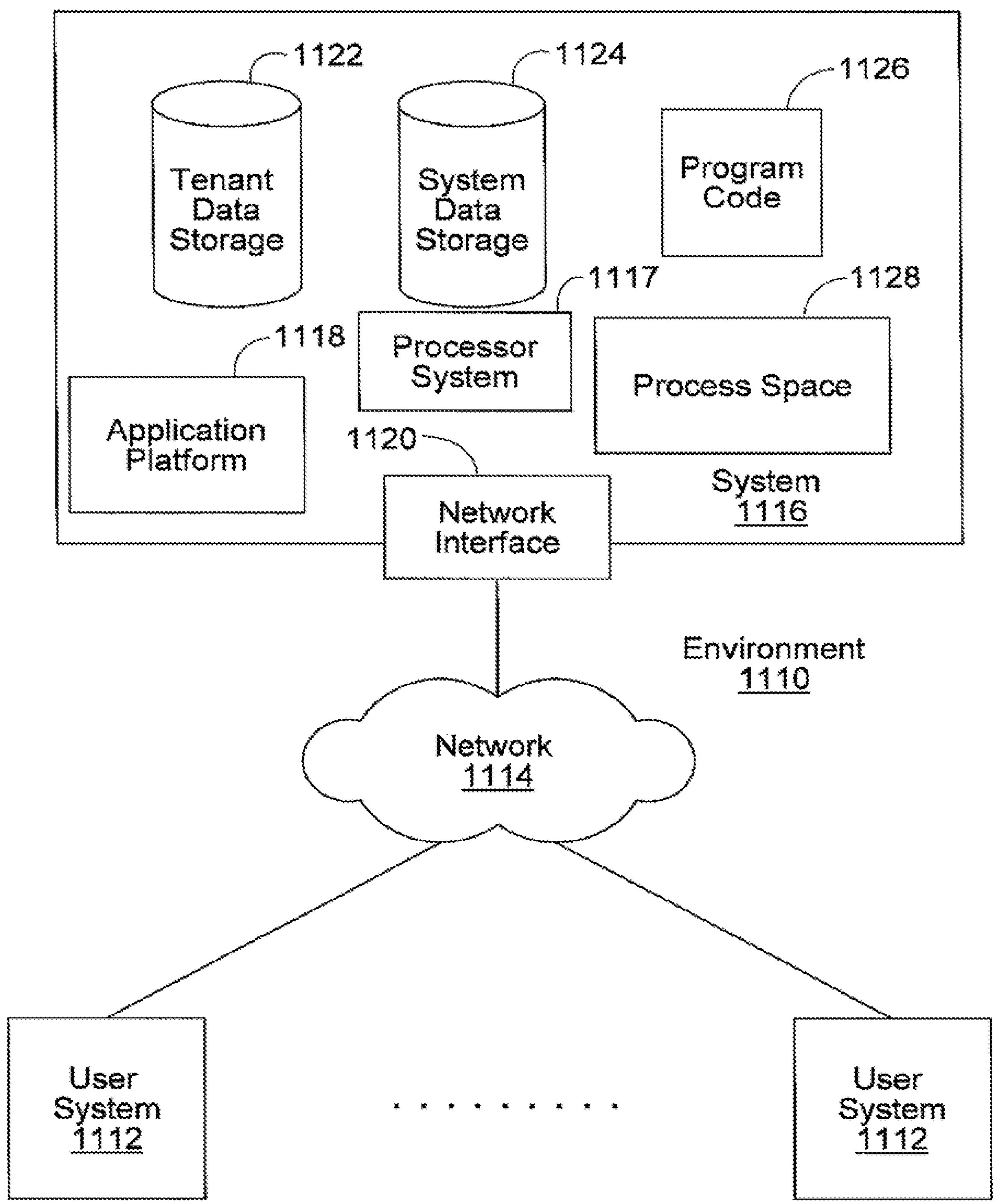
FIG. 11 shows a block diagram of an environment wherein an on-demand database service might be used.

FIG. 11 illustrates a block diagram of an environment 1110 wherein an on-demand database service might be used. Environment 1110 may include user systems 1112, network 1114, system 1116, processor system 1117, application platform 1118, network interface 1120, tenant data storage 1122, system data storage 1124, program code 1126, and process space 1128. In other embodiments, environment 1110 may not have all of the components listed and/or may have other elements instead of, or in addition to, those listed above.

Environment 1110 is an environment in which an on-demand database service exists. User system 1112 may be any machine or system that is used by a user to access a database user system. For example, any of user systems 1112 can be a handheld computing device, a mobile phone, a laptop computer, a work station, and/or a network of computing devices. As illustrated in FIG. 11 (and in more detail in FIG. 12) user systems 1112 might interact via a network 1114 with an on-demand database service, which is system 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" will be used interchangeably herein. A database image may include one or more database objects. A relational database management system (RDMS) or the equivalent may execute storage and retrieval of information against the database object(s). Application platform 1118 may be a framework that allows the applications of system 1116 to run, such as the hardware and/or software, e.g., the operating system. In an embodiment, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

The users of user systems 1112 may differ in their respective capacities, and the capacity of a particular user system 1112 might be entirely determined by permissions (permission levels) for the current user. For example, where a salesperson is using a particular user system 1112 to interact with system 1116, that user system has the capacities allotted to that salesperson. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I", that network will be used in many of the examples herein. However, it should be understood that the networks that the one or more implementations might use are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a browser for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1116, shown in FIG. 11, implements a web-based customer relationship management (CRM) system. For example, in one embodiment, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 1116 may provide tenant access to multiple hosted (standard and custom) applications, including a CRM application. User (or third party developer) applications, which may or may not include CRM, may be supported by the application platform 1118, which manages creation, storage of the applications into one or more database objects and executing of the applications in a virtual machine in the process space of the system 1116.

One arrangement for elements of system 1116 is shown in FIG. 11, including a network interface 1120, application platform 1118, tenant data storage 1122 for tenant data 1123, system data storage 1124 for system data 1125 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

Several elements in the system shown in FIG. 11 include conventional, well-known elements that are explained only briefly here. For example, each user system 1112 could include a desktop personal computer, workstation, laptop, PDA, cell phone, or any wireless access protocol (WAP) enabled device or any other computing device capable of interfacing directly or indirectly to the Internet or other network connection. User system 1112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1112 to access, process and view information, pages and applications available to it from system 1116 over network 1114. Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 12:
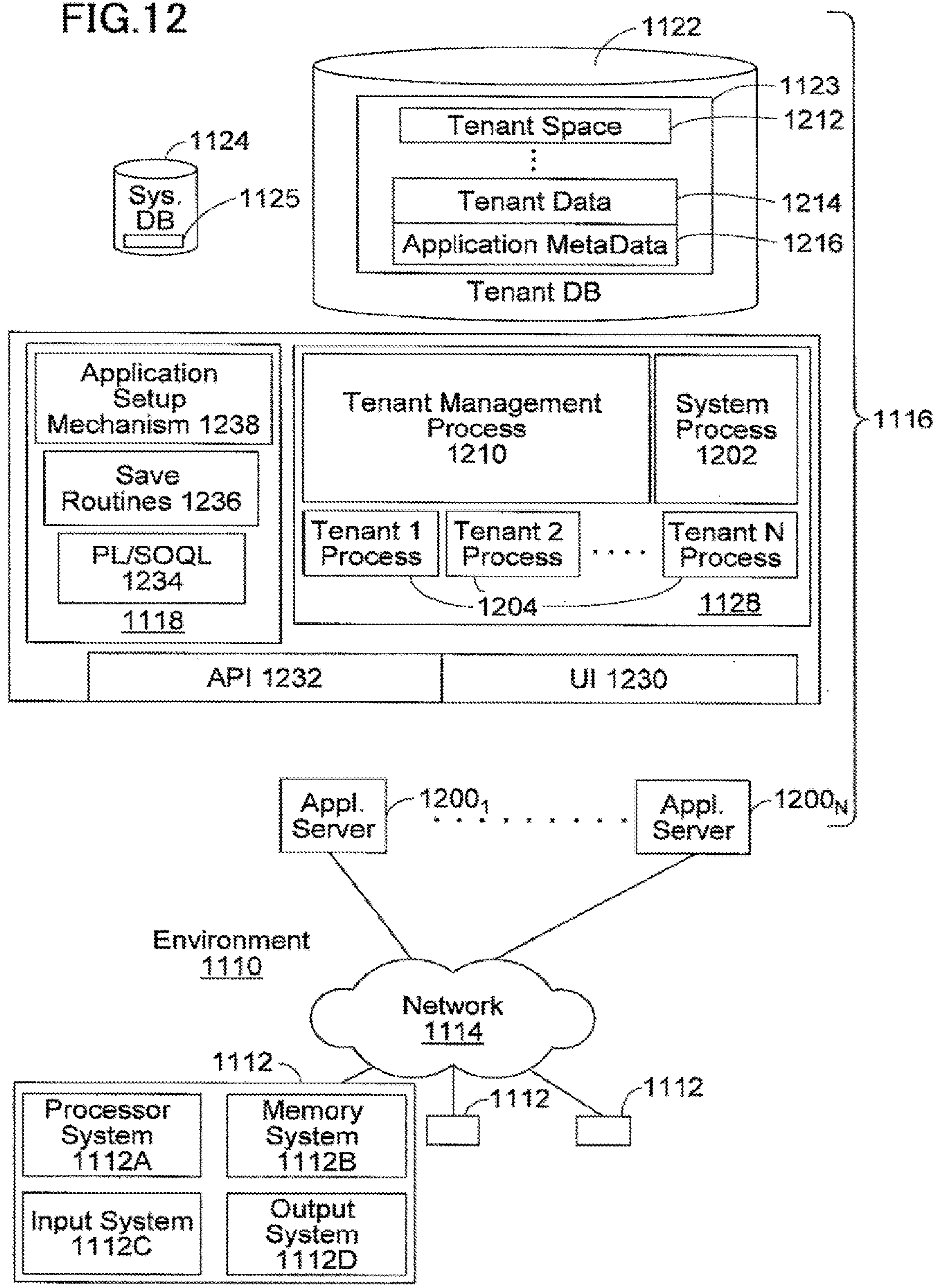
FIG. 12 shows additional details of an on-demand database service including the environment of FIG. 11.

FIG. 12 also illustrates environment 1110. However, in FIG. 12 elements of system 1116 and various interconnections in an embodiment are further illustrated. FIG. 12 shows that user system 1112 may include processor system 1112A, memory system 1112B, input system 1112C, and output system 1112D. FIG. 12 shows network 1114 and system 1116. FIG. 12 also shows that system 616 may include tenant data storage 1122, tenant data 1123, system data storage 1124, system data 1125, User Interface (UI) 1230, Application Program Interface (API) 1232, PL/SOQL 1234, save routines 1236, application setup mechanism 1238, applications servers $\mathbf{1200}_1$-$\mathbf{1200}_N$, system process space 1202, tenant process spaces 1204, tenant management process space 1210, tenant storage area 1212, user storage 1214, and application metadata 1216. In other embodiments, environment 1110 may not have the same elements as those listed above and/or may have other elements instead of, or in addition to, those listed above.

User system 1112, network 1114, system 1116, tenant data storage 1122, and system data storage 1124 were discussed above in FIG. 11. Regarding user system 1112, processor system 1112A may be any combination of one or more processors. Memory system 1112B may be any combination of one or more memory devices, short term, and/or long term memory. Input system 1112C may be any combination of input devices, such as one or more keyboards, mice, trackballs, scanners, cameras, and/or interfaces to networks. Output system 1112D may be any combination of output devices, such as one or more monitors, printers, and/or interfaces to networks. As shown by FIG. 12, system 1116 may include a network interface 1120 (of FIG. 11) implemented as a set of HTTP application servers 1200, an application platform 1118, tenant data storage 1122, and system data storage 1124. Also shown is system process space 1102, including individual tenant process spaces 1104 and a tenant management process space 1110. Each application server 1200 may be configured to tenant data storage 1122 and the tenant data 1123 therein, and system data storage 1124 and the system data 1125 therein to serve requests of user systems 1112. The tenant data 1123 might be divided into individual tenant storage areas 1112, which can be either a physical arrangement and/or a logical arrangement of data. Within each tenant storage area 1212, user storage 1214 and application metadata 1216 might be similarly allocated for each user. For example, a copy of a user's most recently used (MRU) items might be stored to user storage 1214. Similarly, a copy of MRU items for an entire organization that is a tenant might be stored to tenant storage area 1212. A UI 1230 provides a user interface and an API 1232 provides an application programmer interface to system 1116 resident processes to users and/or developers at user systems 1112. The tenant data and the system data may be stored in various databases, such as one or more Oracle databases.

Application platform 1118 includes an application setup mechanism 1238 that supports application developers' creation and management of applications, which may be saved as metadata into tenant data storage 1122 by save routines 1236 for execution by subscribers as one or more tenant process spaces 1204 managed by tenant management process 1210 for example. Invocations to such applications may be coded using PL/SOQL 1234 that provides a programming language style interface extension to API 1232. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 1216 for the subscriber making the invocation and executing the metadata as an application in a virtual machine.

Each application server 1200 may be communicably coupled to database systems, e.g., having access to system data 1125 and tenant data 1123, via a different network connection. For example, one application server 1200*i* might be coupled via the network 1114 (e.g., the Internet), another application server $\mathbf{1200}_{N-1}$ might be coupled via a direct network link, and another application server $\mathbf{1200}_N$ might be coupled by yet a different network connection. Transfer Control Protocol and Internet Protocol (TCP/IP) are typical protocols for communicating between application servers 1200 and the database system. However, it will be apparent to one skilled in the art that other transport protocols may be used to optimize the system depending on the network interconnect used.

In certain embodiments, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In one embodiment, therefore, an interface system implementing a load balancing function (e.g., an F5 Big-IP load balancer) is communicably coupled between the application servers 1200 and the user systems 1112 to distribute requests to the application servers 1200. In one embodiment, the load balancer uses a least connections algorithm to route user requests to the application servers 1200. Other examples of load balancing algorithms, such as round robin and observed response time, also can be used. For example, in certain embodiments, three consecutive requests from the same user could hit three different application servers 1200, and three requests from different users could hit the same application server 1200. In this manner, system 1116 is multi-tenant, wherein system 1116 handles storage of, and access to, different objects, data and applications across disparate users and organizations.

As an example of storage, one tenant might be a company that employs a sales force where each salesperson uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In certain embodiments, user systems 1112 (which may be client systems) communicate with application servers 1200 to request and update system-level and tenant-level data from system 616 that may require sending one or more queries to tenant data storage 1122 and/or system data storage 1124. System 1116 (e.g., an application server 1200 in system 1116) automatically generates one or more SQL statements (e.g., one or more SQL queries) that are designed to access the desired information. System data storage 1124 may generate query plans to access the requested data from the database.

Each database can generally be viewed as a collection of objects, such as a set of logical tables, containing data fitted into predefined categories. A table is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Overview: Replication, Instances, and Chunks

Replication is a process where each instance of a database continually exchanges modified database records for a set of tables, typically a small set, with other instances of the database. It is a goal for replicated tables to be identical everywhere. For example, a database instance may contain the most recent copy of all users from all instances, and is used to ensure that users can log in regardless of which instance they arrive at.

"Database instances" are disjointed (sharded) sets of customer data, each of may resides on a physically and logically distinct, shared-nothing database servers. Data is often not the same across different instances. Instead, each database has different data in every table. The cross-instance data replication described herein forms an exception to that situation. Instead, the environment 1110 comprises a multi-master replication system, which allows a large set of peer instances (multiple masters) to collaboratively replicate data to each other.

Figure 1:
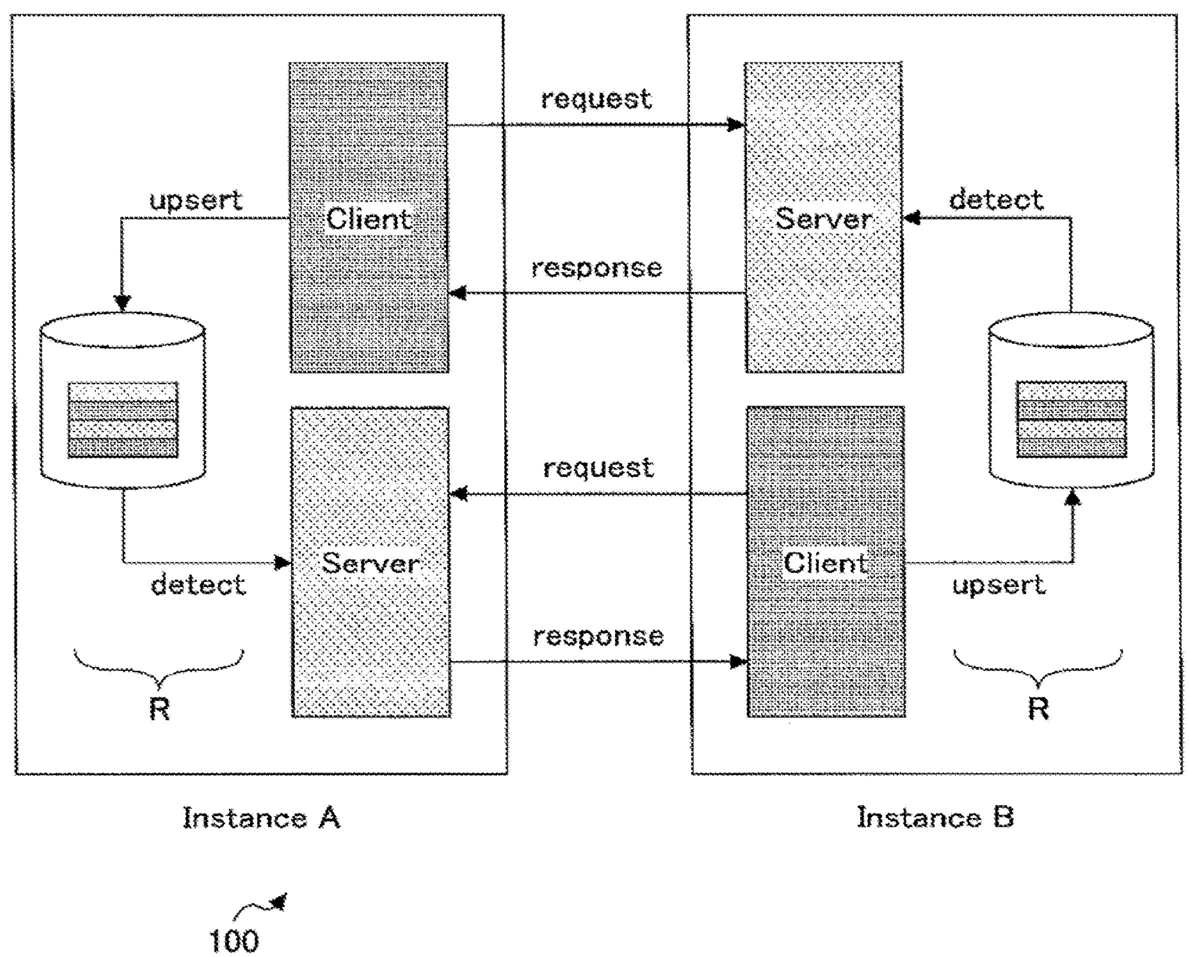
FIG. 1 shows an example arrangement of database instances.

An arrangement 100 of instances is shown in FIG. 1. Within the arrangement 100, a replication process R runs continually in the background for every instance of a database. In this embodiment, each instance acts as both a client (asking all known peers for their updates) as well as a server (providing its own data to other instances upon request).

An instance may detect changes made directly on that instance. Instances package these changes into chunks, which store metadata about a set of changed records. These chunks are then sent to other instances where they are persisted locally and applied (upserted) to the underlying table. Lists of chunk metadata are passed around between instances and copied locally to each instance; then, each chunk is requested and the records contained in it are persisted (upserted) to the underlying replicated table. In a LIST command, the result obtained is a list of chunks with their IDs and metadata, but no data from the underlying tables.

All instances need to find out about and obtain modifications to shared tables. The chunks described herein provide a single consistent unit to deal with both change detection and transport.

The embodiments disclosed herein promote and enhance reliable database replication. For the purposes of this disclosure, replication consists of 4 main processes: I Change Detection, II Serving Changes, III Requesting Changes, and IV Upserting Changes. Within any given instance, responsibility for these four processes will belong to either the client or server, and will be so designated below.

I Change Detection (Responsibility of Server)

Detecting changes properly within a database system is a subtle process. The desired end result of a change detection process is that any modification to an underlying table results in one or more chunks being created, which an instance's server will then serve upon request. In an embodiment, a change detection process utilizes an indexer framework.

Figure 2:
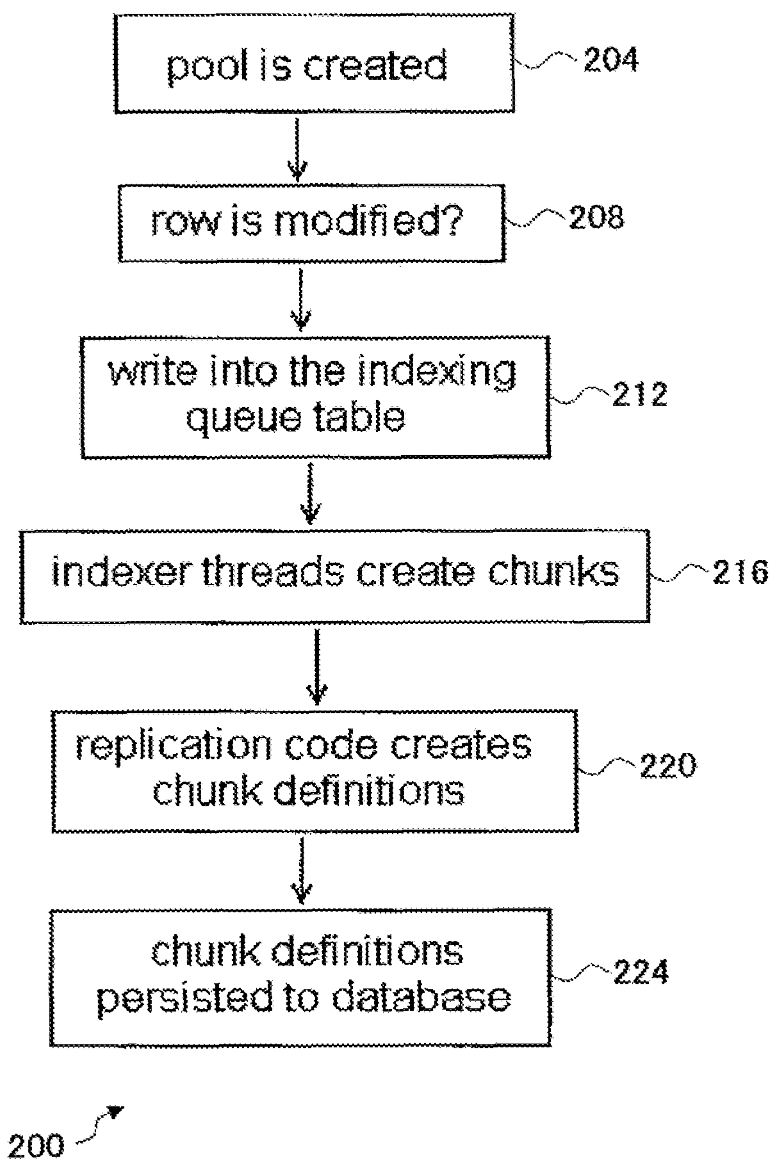
FIG. 2 shows an example change detection process.

An example change detection process is shown in FIG. 2.

1. On startup, a pool of change detection threads is created by an indexer.
2. When a row in a replicated database table is modified (e.g. a "write"), a trigger writes into an indexing queue table, containing the partition number, entity and date of the change (but not necessarily the specific rows that changed). Data is processed in the indexer in discrete streams; a non-limiting example would be 32 streams based on a hash of the primary key of the data.
3. A group of indexer threads watch the queue and pull out aggregates of changed rows, breaking them up into manageable segments referred to hereinafter as chunks. In doing so, the indexer threads resolve any potential single-modstamp and multi-session deadlock issues.
4. The replication code then creates chunk definitions by looking at the first and last records in the segment, as well as other chunk metadata.
5. These chunk definitions are then persisted to the database, and barring any unusual events, are ready to serve.

As shown in FIG. 3, in an embodiment, chunk metadata can include unique instance ID, entity type (key prefix), database partition number (1-32), timestamp boundaries of the chunk (min/max), and optionally, ID boundaries to handle single modstamp cases (min/max). This results in a set of virtual streams of chunks which are independent of each other and can be processed in parallel. The data-sizes shown in FIG. 3 are for example only.

Detecting deletes is slightly different from detecting changes (e.g. writes). In addition to triggering the indexer to run, deletes also fire a trigger that writes the deleted key to a separate delete record/table. These delete markers are then treated the same as inserts and updates. Any query that gets modifications from the underlying table always gets both modifications together.

During the change detection process, the underlying records may be selected from a database in order to determine a chunk's properties. At this time, if so configured, such a change detection process can immediately cache a serialized version of the chunk.

II Serving Changed Data (Responsibility of the Server)

Serving data is a passive process. Requests for data may be made over HTTP and served by a servlet running on standard front-end web servers. The data itself may be returned in binary format, serialized into binary format using any desired serialization library on a server, and deserialized via the same serialization library into java objects on a client.

In an embodiment, two HTTP operations are used to serve the changed data: LIST, which returns a set of the available chunks, by entity, date, etc, and GET, which returns the underlying data for exactly one chunk, by ID. An example 400 of such a serving process is shown in FIG. 4.

Figure 4:
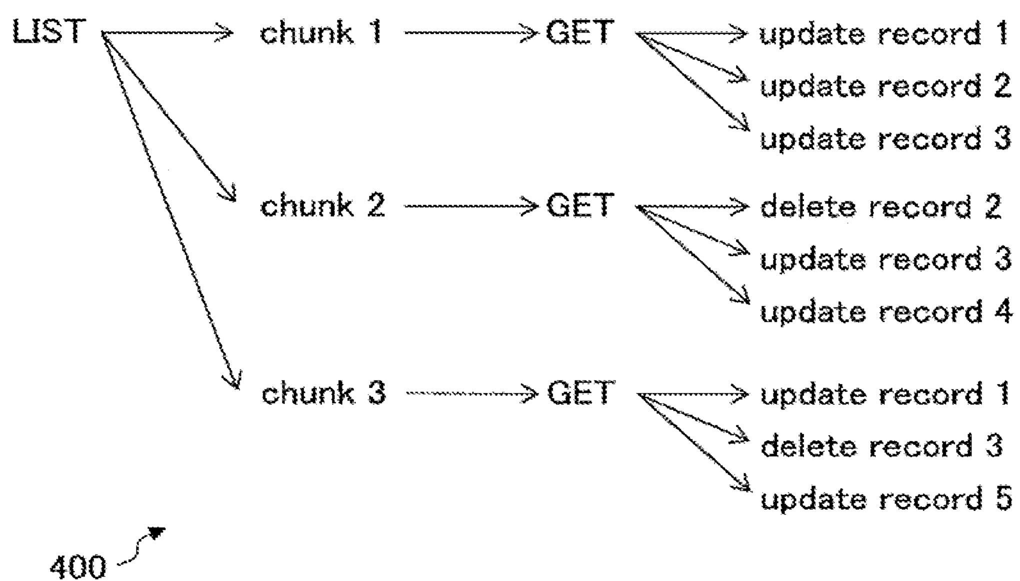
FIG. 4 shows an example serving process.

In FIG. 4, a LIST operation is initiated on multiple separate chunks each having a variety of records. The result is a variety of chunks, identified for simplicity merely as chunk 1, chunk 2, and chunk 3, although many other ways of listing chunks exist. After having identified the chunks, a GET operation is performed thereupon. This returns underlying data associated with that chunk. That data is then served (e.g. updated, deleted, etc).

Servers can return requested chunks in one of two ways: either directly from the underlying tables, or from the cache referred to earlier.

Any instance can honor requests from any other instance, about their own data or data from another instance (as in the case of leaders, which will be explained in more detail below). If an instance's server can not answer the request, it returns an HTTP error status code indicating the nature of the problem. Generally, this indicates an unexpected error, but there are some cases where it can indicate an expected condition (such as asking a leader for a remote chunk that is so old that leader no longer has it).

III Requesting Changed Data (Responsibility of the Client)

It is important that the current state of the distributed database system always be available. The following is one non-limiting example of achieving this.

To formulate requests, a client looks at its map of who the instances and leaders are in each data center, in order to decide who to ask for which data. This information can be maintained as a standard part of instance deployment via XML files that are created and maintained as part of the source code configuration tree (configs). Each instance contains pointers to all other instances, including a unique one-character instance ID, a URL, and a few other pieces of information. This configuration information exists separately on each physical machine in the cluster, and should be (but is not guaranteed to be) identical.

To maintain a consistent view of this information across the entire distributed database system, a replication process exists that synchronizes this XML configuration information into a single instance configuration table within the distributed database system. All database updates—whether related to changes in the underlying XML files during releases, or related to run-time changes in state like discovering that a particular instance is currently unreachable—are routed into this instance configuration table, so that every actor (whether client or server) shares the same view of the current state of the instance list.

The source of truth for the instance configuration table is the information in the XML files. The information contained therein is static, in that it only changes when a human (presumably a developer or operations person) manually changes it (for example, when bringing an entirely new instance online).

In addition, the instance configuration table also holds a set of dynamic information that is equally important. This information includes at least the following (not a close-ended list): whether the instance is currently known to be reachable, the last date when the instance was successfully reached by the current instance, and a data structure containing the most recently applied chunk date for each replicated entity.

This information is critical to successful operation of the embodiments described herein, and thus is stored in a database table (rather than simply being read from read-only XML files at run time). When an instance becomes unreachable, for example because of a network partition between data centers, it is important that all the individual machine nodes within an instance share the same view, and get the same results from the leader election algorithm.

A database table is used to store the instance configuration information because doing so is inexpensive and expedient, but other forms of shared coordination are also contemplated within the embodiments disclosed herein.

Figure 5:
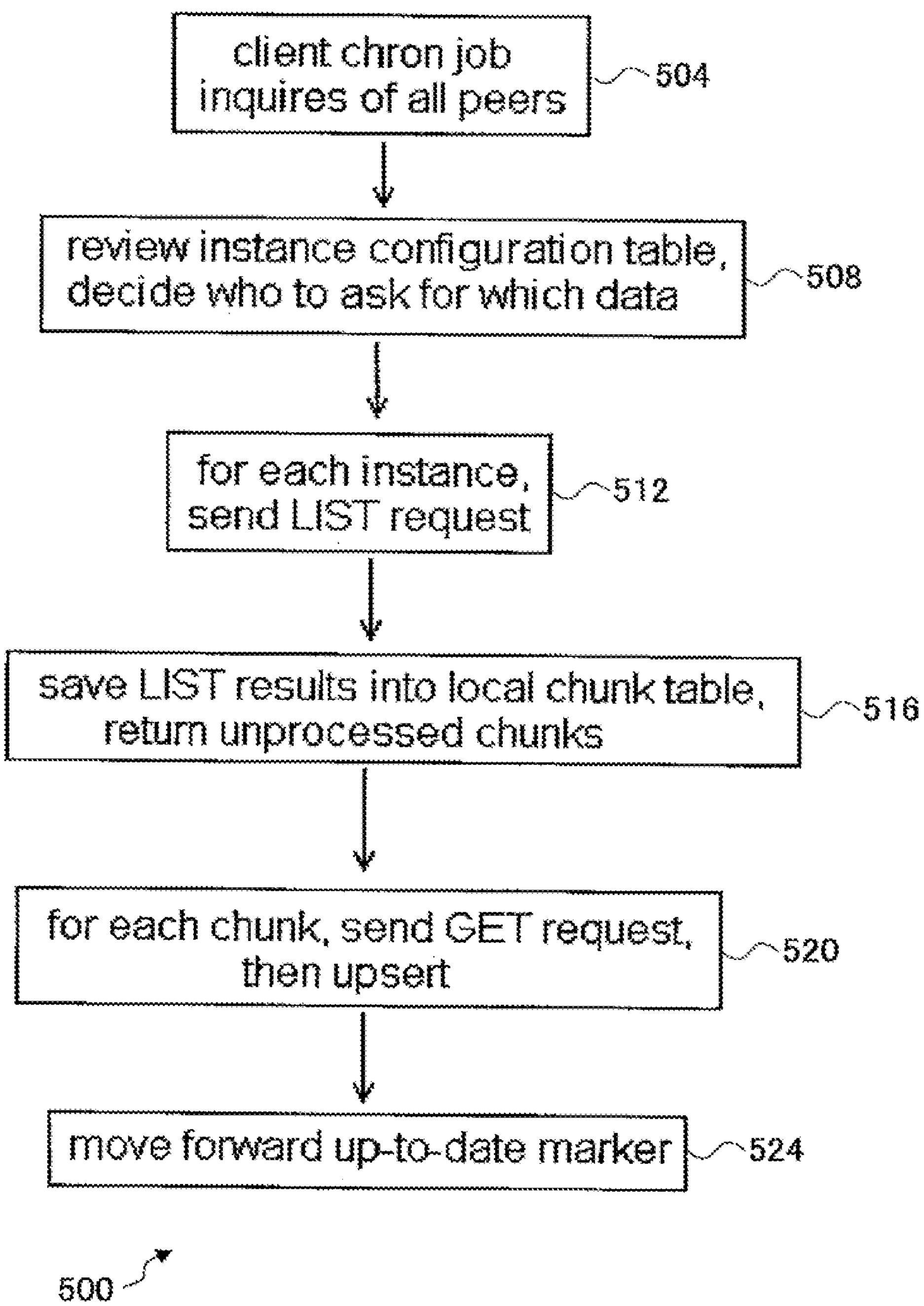
FIG. 5 shows an example client replication flow 500.

In an embodiment, replication logic is also held within the client. An example client replication flow 500 is shown in FIG. 5.

1. In step 504, a client cron job runs periodically (e.g. every 60 seconds) to get the latest data from all peers.
2. In step 508, to formulate requests, the client looks at the instance configuration table showing who the instances and leaders are in each data center, and decides who to ask for which data.
3. In step 512, for each instance receiving a request, a LIST request is sent, with parameters specifying the desired kind of data (filtering by source instance identifier and entity), and how much of that data (i.e. what the oldest chunks are, based on how current that instance's data is).
4. In step 516, the results of the LIST request are saved into a local chunk table, and any chunks that are new (i.e. haven't already been upserted) are returned for processing. Optionally, the server can also do a type of clean-up, that is, look for older unprocessed chunks that are already in its local chunk table, but haven't yet been upserted.
5. In step 520, for each chunk returned by the previous step, a client sends a GET request for the chunk, and then upserts the resulting records. This is done in order of RAC node, to ensure maintenance of RAC node affinity and change database connections as little as possible. RAC stands for Real Application Clusters, a mechanism for achieving clustering and high availability in databases.
6. In step 524, if all chunks in the LIST were successfully upserted for that instance, the client moves forward an "up to date" marker forward to the date of the most recent chunk it got. This date is then used as the "min date" for future list requests to that peer instance.

The local chunk table mentioned above is a database table that maintains information about each chunk of replicated records, both those created on the local instances as well as those obtained from remote instances and applied locally. This is expected to have into the hundreds of thousands of records over time (though this number is kept finite by regular chunk truncation and compaction, as discussed elsewhere herein).

Replication, Leaders, and Non-Leaders

Database replication can be extremely complex, with significant overhead. Each instance produces a stream of modifications (updates, inserts, and deletes) affecting its local database tables. Those modifications must then be applied to every other instance in the set of peer instances. As an example, consider 12 peer instances; a single insert into each instance will result in a total of 144 inserts once everything is replicated (i.e., the 12 original inserts, plus all 12 instances also inserting the row from each of their 11 peers).

Naturally, these modifications must also be transported between the instances, via the network. At a minimum, every row must make at least N−1 hops, from the source to the destination (for a total of 132 hops, in this scenario).

Figure 6:
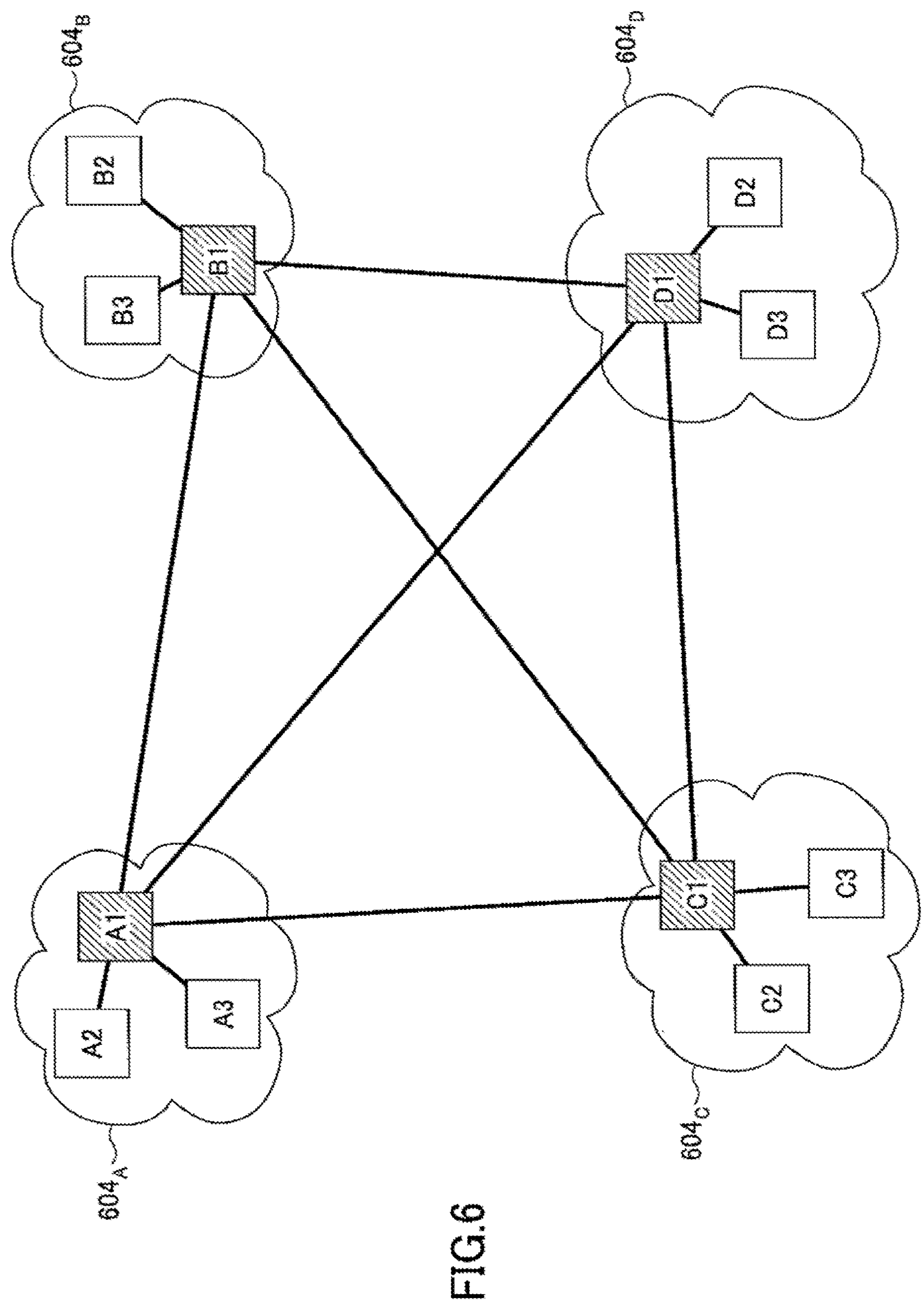
FIG. 6 shows an example arrangement of data centers.

An example arrangement 600 of data centers 604$_x$ and instances is shown in FIG. 6. Within a data center 604$_x$, a hop is cheap. Outside a data center 604$_x$, a hop is expensive. Thus, all hops are not created equal. Therefore, it is sometimes more globally optimal to force instances into a more constrained graph where expensive hops are shared by multiple pairs of endpoints.

To facilitate this, as shown in FIG. 6, within any specific data center 604$_x$, one instance (e.g. A1, B1, C1, D1) acts as leader; all other instances (e.g. A2/A3, B2/B3, etc) in the data center 604$_x$ talk to each other and to the leader, but not to any other instances outside the data center 604$_x$. Leaders talk to the other instances in their data center 604$_x$, but they also talk to remote leaders, who provide them the data for all the instances in that leader's own data center. A leader talking to another leader is indicated by the dark lines in FIG. 6.

Leader selection is done by looking at a configured value for each known instance (called "leaderID", stored in the instance XML configuration files explained above), and picking the lowest-numbered reachable instance in each data center to be the leader. In the event of a tie, where two instances have the same number, the tie is broken by referring to the instance name in ascending order. LeaderIDs are assigned manually in the XML, configuration files. These monitor general instance health, and choose leaders in order of desirability based on load. It is preferred that leaders be instances that are not already operating at their maximum capacity.

"Unreachable" means "temporarily inactive". If an instance attempts to communicate with another instance and receives an I/O error (any kind of error saying that the connection couldn't be completed), that instance immediately marks the other instance as "unreachable" and then re-runs the leader election algorithm to determine whether the removal of this instance changes who the currently configured leaders are.

Reachability of all instances is constantly being re-evaluated. Instances will continue to attempt to reach instances they previously marked as unreachable, and as soon as a connection can be made again, the instance is marked as reachable again, thereby re-initiating another leader election process.

If an instance is not a leader, that instance communicates directly with everyone in its data center. From the other non-leader instances, that non-leader instance can request only their local updates. A leader instance can request data for all remote instances. A leader communicates with everyone in its data center, plus the leaders in other data centers. Local instances request updates directly from all other local instances. It is possible to request data for all the instances in from a remote leaders'data center.

In addition to serving their own changes, in one embodiment, instances can also act as a proxy for changes made elsewhere, particularly if they are acting as the leader for their data center. In that case, other peer instances may ask them for changes that are not their own, and that instance's server can reply with their local copy of the changed data. For example, from FIG. 6, a leader A1 may ask leader B1 for non-leader B2's changes, rather than inquire directly to B2.

Upserts don't trigger a change detection process on a destination instance because the source instance ID is different from the destination instance ID. As such, the change detection triggers do fire, but nothing is written to the indexer queue or delete log.

IV Upserting Changed Data (Responsibility of Client)

Once a client receives new data from a remote server, that client seeks to push that data into its own local database tables as quickly as possible. In this upsert process (which is really more of an "upselete" process, since it includes deletes), the blob (binary large object) of records is passed into a PL/SQL procedure. Two core PL/SQL statements are used within the upsert process: MERGE (for the inserts and updates) and DELETE (for the deletes). Both statements check that the modstamp of the new row is strictly later than the existing one; otherwise, the new row is ignored. This makes the upsert process both idempotent and resilient to reordering. Chunks can be processed in any order, and the end state will be the same.

In addition to running a DELETE statement for delete rows, an instance also persists these into its own delete table. This is only necessary for leader instances, who may be called on to resend the upserted chunk to another instance (only if the serialized form of the chunk isn't cached). However, since any instance can become a leader at any time, all upserts store the delete markers.

Managing Chunks, Compaction

Normal operation over the course of a day can cause an instance to create a large number of chunks. The absolute maximum (for a partitioned entity assuming 60 second change detection granularity) would be 32 partitions*1440 runs=46080 chunks/day. It is unlikely that a single instance would see a modification to a record in every partition every minute of the day, so the real number will likely be much smaller than that.

After some period of time, normal system operation will distribute these updates to all other instances, so that it ceases to be necessary to keep all the historical chunks. It is still desired to have the ability to serve the modifications from an earlier period if asked, e.g. if a peer instance was offline for some large period of time, or needs to rebuild its table from scratch.

Accordingly, instead of just truncating the old chunks, they are compacted by combining their definitions and forming a minimum covering set, which are marked as catchup chunks. Assuming there were fewer than 3000 modifications in each partition during the course of the day on that instance, the entire set of chunks would be replaced by a single chunk for that partition. If there were more than 3000 modifications, then the system would create multiple spanning chunks.

Figure 7:
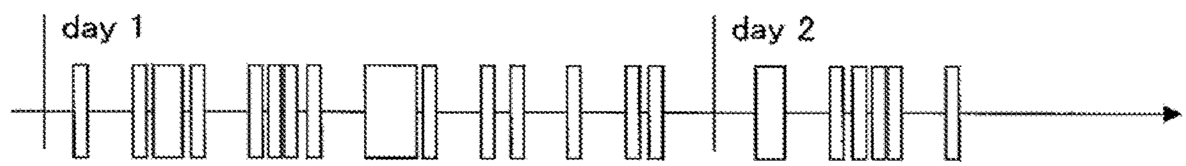
FIG. 7 shows an example method for compaction of chunks.
Figure 7:
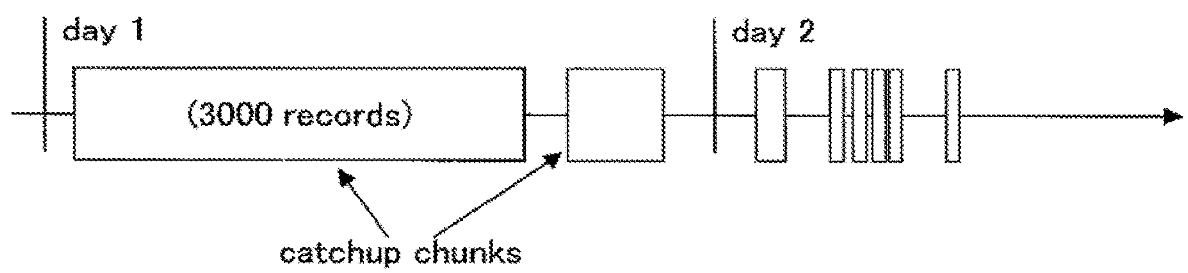

An example of this compaction is shown in FIG. 7. At the time of compaction, the compacted chunks have all been fetched by everyone who needs them. That is, the original chunks are essentially exchanged for catchup chunks that cover the same data ranges in a more efficient manner. As soon as the catchup chunk has been created, all the original chunks which covered that range are deleted.

Requests for data older than the compaction threshold return these catchup chunks, which are exactly the same as regular chunks, except:

1) they are marked with a special bit showing that they're catchup chunks;
2) they're never cached in binary form, either on the client or the server; and
3) they can only come directly from the source instance, and not from a leader.

Catchup chunks are only saved on the original source instance; leaders do not save catchup chunks they receive from other instances. So if a LIST request is seeking data that's older than the compaction threshold from a leader, the leader will send a reply saying "this is too old, go ask the instance directly." An instance will always serve its own chunks, regardless of whether it is a leader. The only difference is that if it's a leader, it will also serve chunks it has cached from other instances.

If an instance falls behind for any reason (say, a network outage), it can still request older data from peers. This is accomplished transparently by the use of catchup chunks, because they cover the entire history of the replication process.

A global catchup (i.e. restart from empty) could occur by doing a catchup with each peer in turn. It is desired to avoid triggering a global catchup process, except perhaps during the creation of a new instance, or the split of one instance into multiple instances. However, there can be times when a global catchup can't be avoided. It's a natural extension of the method of keeping historical data in catchup chunks, so its helpful to implement a facility for global catchup.

Catchup chunks are never totally discarded. At all times, every instance should contain a full history of chunks spanning from the beginning of time (i.e. the earliest modification in the base table), up until the present. This results in extra storage overhead, but is necessary to preserve the integrity of the environment 1110.

Transport Format

The distributed database system serializes the chunks being passed over the wire. The chunks are serialized into binary using any desired serialization library on the server, such as Apache™ Avro, and deserialized via the same serialization library into java objects on the client. The serialized version is smaller than a mere plain text version. Thus, the distributed database system saves both time and space.

Cache V. Recreate

Data can be served in two ways. One way is to use the parameters of the chunk (source instance ID, key prefix, partition number, and time/ID boundaries) to assemble a dynamic SELECT statement which pulls the rows directly from the underlying table and serializes them into binary form. This will always work on the source instance, and will work on leader instances as long as that chunk has first been upserted locally.

An alternative which may be more efficient in some cases is for instances to cache the serialized form of the chunk in a database BLOB field (in addition to upserting it). When the chunk is requested, instead of running a SELECT and serializing the results, the server can simply return the binary blob to the client.

The main difference between these methods, aside from performance, is that the former is susceptible to subsequent changes in the underlying table (i.e. if rows are deleted or updated with a later modstamp, they may no longer fall within the bounds defined by the chunk, and so they wouldn't be "seen" by the SELECT statement).

Within the latter cached version however, the set of changes is frozen and will be resent as-is. Both methods yield the correct result. The former may be slightly more efficient by virtue of removing redundant data, but the latter may be more efficient in reducing processing and contention on the underlying table.

Additionally, caching the serialized form of the chunk removes the need to store deletions in an entity such as replication_record_deletion.

It is not necessary to cache every chunk. Caching everything would amount to keeping an entire second copy of the replicated table on disk, which is inefficient. Even worse; over time, the same records can be updated many times, and caching all chunks permanently would result in many copies of the data, in a way that would grow but never shrink. For that reason, only non-catchup (active) chunks are eligible for caching.

Partitioning

Not all tables within the environment 1110 use a specific physical partitioning. Specifically, optimization commands related to partitions could potentially cause errors. Accordingly, the physical database commands used to get and modify data are slightly different for cases where the table is not partitioned.

Chunks And Immutability

Chunks aren't technically immutable, because for non-cached chunks, the underlying data can change, including changes that add or remove records to the tables covered by the chunk. However, chunks are "functionally immutable" because any version of a specific chunk is just as correct as any other version, from the point of view of the system's eventual state.

For example, imagine that an update to record A at time T2 is covered by Chunk 1, which has time boundaries from T1 to T3. Now suppose that data corresponding to record A is later updated again at time T4, and is covered again by a new chunk, Chunk 2. Performing a SELECT statement for the definition of Chunk 1, which says "WHERE source_system_modstamp>=T1 and source_system_modstamp<=T3" will no longer return this user. The chunk definition hasn't changed, but the set of users it covers has changed.

The opposite problem is less likely, but can still happen due to long-running transactions; User A wasn't originally covered by Chunk 1 because its timestamp was TO. However, at some point after the chunk is defined, a long-running transaction commits that changes the modstamp to T2, so the user is now covered. Clients that requested the chunk before this time would not receive the record, and clients that requested the chunk after this time would.

Fortunately, because of the chunk management described herein, there is no danger of "losing" any updates such as the unusual situation described above, even for long running transactions. This is because such a long-running transaction would eventually cause the creation of another overlapping chunk. Thus, even if other clients have already received the first version of the chunk that didn't have this record, they'll still get the newer version of the chunk that does.

There can be a small set of perverse conditions that could cause an indefinite delay in a record being propagated. For example, a record can be updated over and over again, where these updates always fall after the previous update was detected and packaged, but before it is served. As such, the record would be continually bumped to the next chunk, but no chunks would ever actually contain the record. This bumping is extremely unlikely, but could happen if records were updated by some automatic process that happened to have the same period as change detection and client processing.

One example solution to this problem could be to set the frequency of the change detection and client processes to slightly different values, for example, off by 1 second, so they naturally cycle over time. While it's still theoretically possible that an endless series of updates exactly falls between the detection and serving frequency, this step effectively lowers the probability to near zero.

Advantages of Chunks

Adding the abstraction of the chunks described herein yield a number of benefits. A chunk is a discrete unit of progress which makes reasoning about the state of the system easier. If something is missing, it is possible to trace exactly which chunk(s) were missed, rather than for example figuring out which records may or may not have been included, based on timestamps. This leads to simpler error detection and correction capabilities.

Additionally, a chunk can be either cached or recalculated, depending on which is more efficient. A chunk allows transport logic (requesting, handling, etc.) to be mostly ignorant of what data is contained within the chunk, so the environment 1110 can easily add new replicated entities in the future, and make global optimizations and changes without copying code.

One of the most important benefits of the architecture of the embodiments herein is scalability. Scalability refers to how the environment 1110 behaves as the number of instances grow. Because chunks are specific to a single instance, there's absolutely no overlap between chunks from difference instances. Thus, the use of chunks reduces the raw byte traffic compared to a more naïve approach. The process of replication is still complex and consumes a significant amount of overhead, because each instance needs to fetch and upsert data for every other instance. But, under normal circumstances, the system only needs to obtain that data a single time. Redundancy is reduced.

Referential Integrity

Because each table in this replicated system functions independently of the others, it's not possible to have direct (database-enforced) referential integrity constraints between replicated tables, such as Foreign Keys. This is because the child table in such a relationship could potentially have rows replicated that reference related rows in the parent table, before the corresponding rows in the parent table are replicated. While one could achieve a semblance of integrity by creating ordering constraints on the replication itself (for example, stating that parent table P is replicated before child table C during each iteration of the client process), there are still possible conditions where this would break down. For example, if related rows were simultaneously inserted in P and C at a point between when the replication client ran for P and for C, the rows of C would be included before their referent rows in P.

This "breaking" of referential integrity is a temporary condition, because presumably the rows in the parent table would be replicated in the next iteration of the client process. As such, it is an "eventually consistent" process globally (though, within an entity it is strictly consistent).

Using "Fudge Factor" in Timing of Chunk Requests

In one implementation, certain conditions about the overall state of the system are assumed, by using "up to" dates. The assumption is that there are no gaps in the list of chunks known to exist. These assumptions can be summarized as follows.

1. When requesting chunks newer than T1, the list of chunks returned is complete for the time period from T1 to the latest date in the LIST; and
2. When the "up-to" date is moved to the latest date, no other chunks will be created with an earlier date.

However, there are some exceptions to these cases. In the embodiments disclosed herein, an example time granularity for requesting chunks is one second. Consequently, multiple chunks could be created within the same second. An instance could ask for these chunks in between their creation, and only get some of them, such as if one chunk is created at 0 milliseconds, while another chunk is created at 999 milliseconds, but a chunk request occurs at 500 milliseconds.

If for some reason a chunk were to be slow to commit, its timestamp may be an earlier time than was actually available. This is the same as the long running transaction problem for the underlying records that was discussed earlier. This is extremely unlikely for chunks, since chunks are generally created and committed in a short atomic block, but it's theoretically possible. One perverse scenario would be that after the stored procedure to insert the chunk has run, but before the request completes and "commit" is called on the database connection, the server enters a long garbage collection pause. This would be extremely unlucky timing, but in large distributed systems with millions of transactions, this kind of event is not impossible.

To account for these problems, an example client process uses a configurable "fudge factor" on its requests. If the client process thinks it needs chunks more recent than T2, the client process will actually send the request for chunks more recent than (T2−f), where f is some number of seconds. The price of a longer fudge time is receiving a list containing one or more redundant chunks. This is acceptable, because it will be apparent that these redundant chunks were already upserted and thus can be ignored. Remember also that this fudge factor is just for the LIST operation, which returns chunk definitions (metadata) but no underlying data, so it's just comparing chunk IDs which consumes only minimal overhead. No underlying data is sent over the wire.

Other factors could also cause data to not be replicated. For example, it is possible to encounter an exception and not actually insert a chunk obtained from a LIST operation. However, an example client process has a configurable setting that allows it to either continue after a failure and attempt to fetch and upsert the remaining chunks it needs, or to grind to a halt and stop processing altogether. Not surprisingly, continuing after failure is more robust and complete, and will avoid endangering other data's replication. Halting on failure is more globally correct, because if a chunk is missed, the entire distributed database system is compromised. For transient problems, continuing after failure is more desirable because a chunk can be retried later.

In a LIST command, the result obtained is a list of chunks with their IDs and metadata, but no underlying data (e.g. no replicated records from the underlying tables). These chunks are immutable, so if the chunk already exists, it isn't updated, it's simply ignored.

Replication and Change Detection

Figure 8:
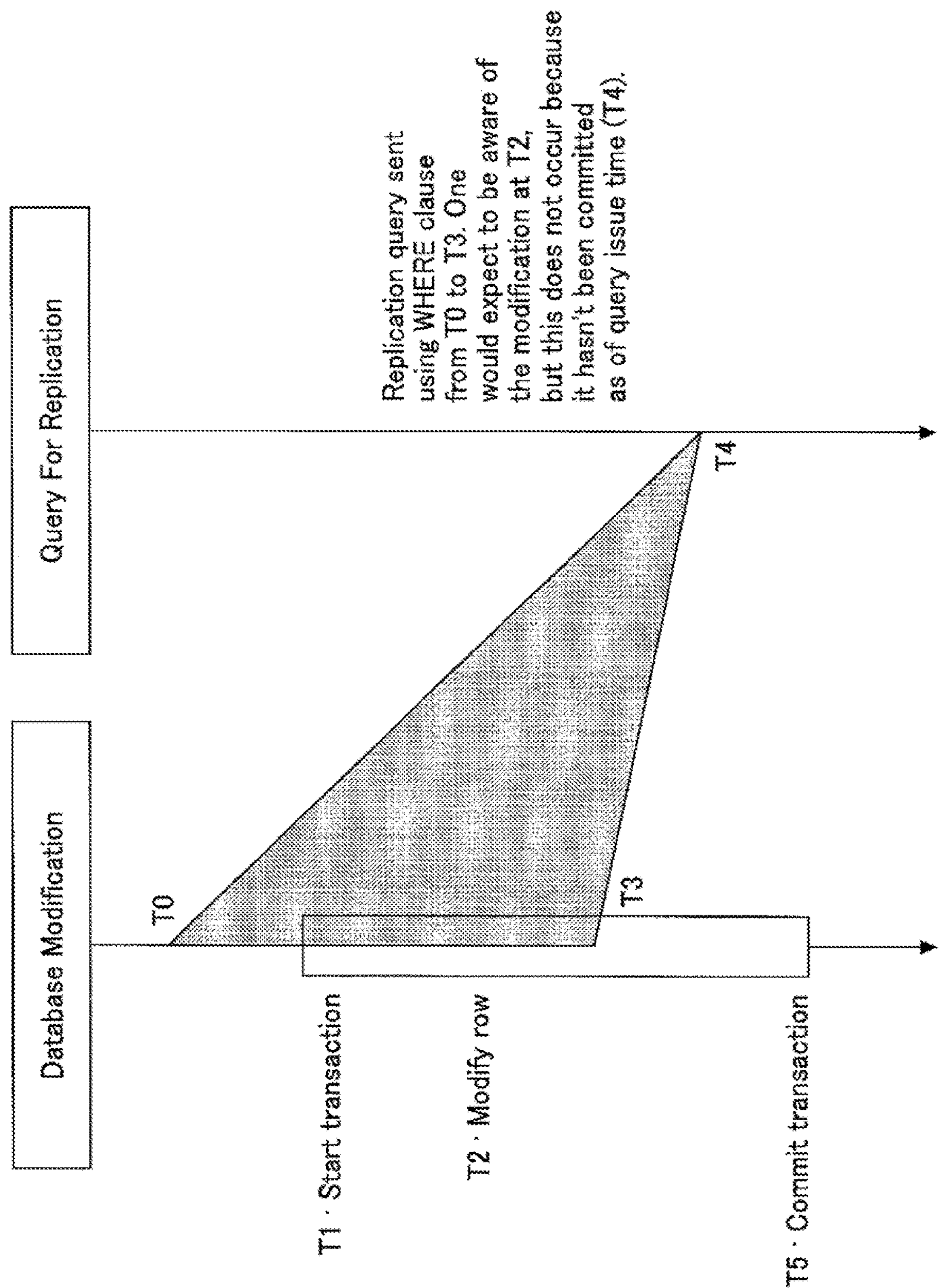
FIG. 8 shows a potential problem related to a replication query.

Another problem with detecting and replicating changes in a distributed database system is that transactions can be uncommitted for any length of time, and when they finally are committed, there may be no way to mark the commit time. For replication, this means that if a transaction is uncommitted while the replication query runs, then its changes won't be seen by the replication query. FIG. 8 shows an example of this problem.

In FIG. 8, time advances downward. A transaction is started at time T1, a row is modified at time T2, but that row is not committed until time T5. Meanwhile, a replication query begun at T4 asks for all records that were modified between T0 and T3, which (theoretically) should include T2. But, since the transaction is still open, T2's modification is invisible to the replication query. When the row does eventually commit, its timestamp will still be T2. On the next replication run, the query begins with time T3, thus missing the update from T2. The database is now compromised.

To resolve this problem, it is possible to use reachback logic, that is, extending the query to cover the same span of time again; for example, extending the reach of the query by 30 minutes, once every 15 minutes. This method still has frequent failures, which become more evident the longer that accessing code holds a transaction open before committing. Without precautions, this would result in records not getting replicated. This approach also has even more severe problems in a multi-hop leader environment.

Consequently, the environment 1110 offers a complex replication mechanism involving multiple queue tables and worker threads that are notified when transactions commit by watching those queue tables. This replication mechanism reads the set of potentially changed records, finds their start and end points, and then writes a new chunk to cover these changes.

Figure 9:
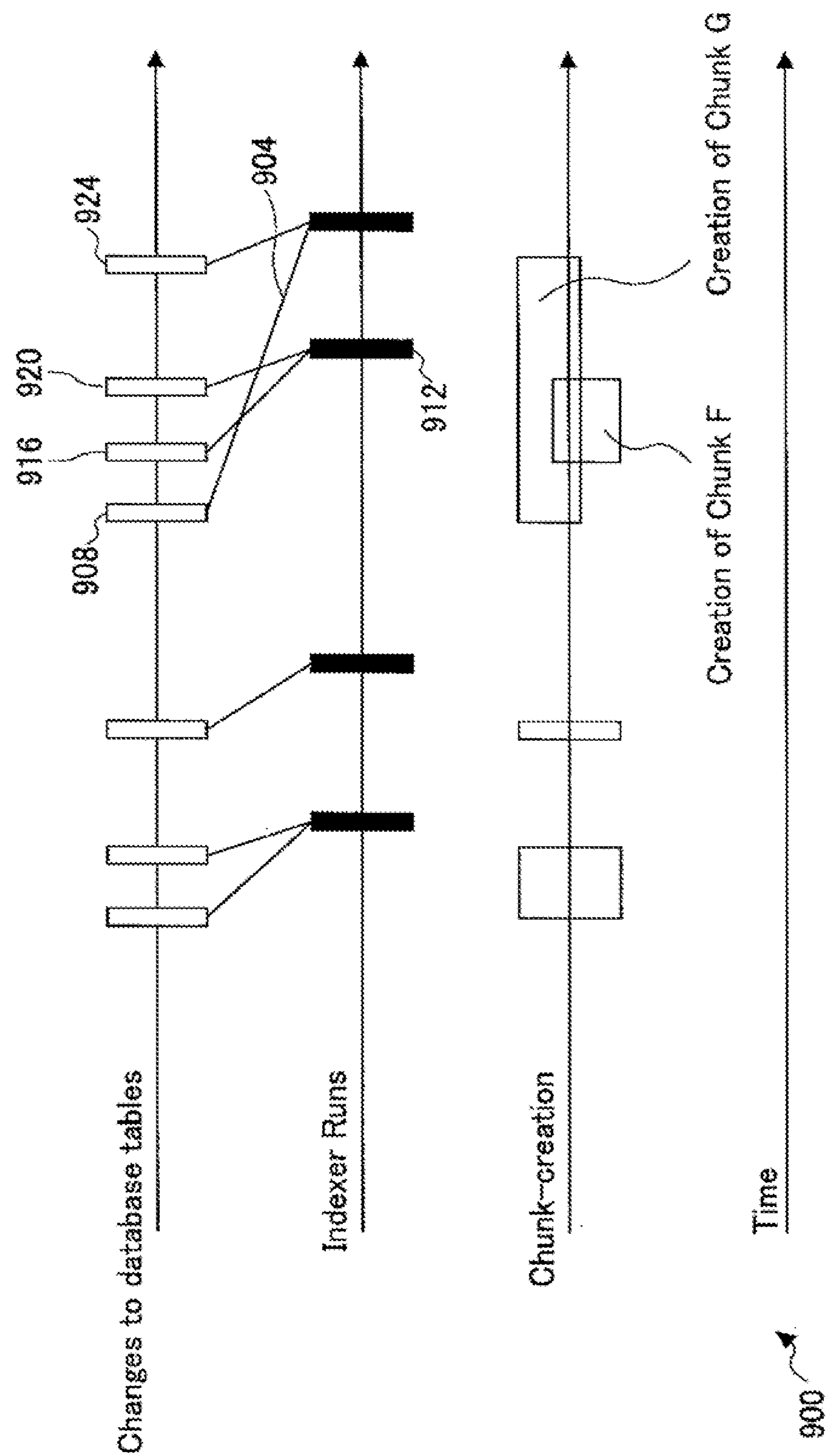
FIG. 9 shows a potential solution to the problem of FIG. 8.

Because transactions can commit in an order that doesn't correspond to the recorded timestamps, the resulting set of chunks may overlap each other. This is not optimal, but nonetheless is guaranteed to be complete and correct. FIG. 9 shows an example of this.

In FIG. 9, time advances to the right. The top line refers to points in time when changes to the underlying database tables happen. The middle line refers to points in time at which the incremental change detection and chunk-creation process runs. This is sometimes referred to as an indexer. The bottom line represents the periods of time for a chunk-creation process. These can overlap in that if a change appears in the base table that is old (like the 4th white box on the top line), that can prompt the change detection and chunk creation process to produce a new chunk that covers this older modification. This means that a chunk might overlap with other chunks that were created previously. For example, in FIG. 9, the time of creation of Chunk F overlaps with the time of creation of Chunk G, which began previously to Chunk F but continues afterwards.

There are actually two timelines in FIG. 9. The timeline of modifications to the underlying base table (top line), and the timeline of creation of chunks that decisively cover these modifications (bottom line). The result is that all peer instances can consume an ordered series of chunks and be assured of obtaining reliable data that may have been modified earlier in time (but that perhaps wasn't visible until later, perhaps because of a long-running transaction).

FIG. 9 intends to show the proper functioning of the improved system. In particular, there are situations that can cause overlapping chunks, by virtue of the fact that some transactions on the underlying table don't immediately commit. So, the change 908 is made at that point in the timeline, but is not yet committed. Then, two more changes 916, 920 occur, which commit immediately and are packaged by the next change detection run (the 3rd black rectangle 912 on the "Indexer Runs" line), resulting in a chunk that spans the time of those two changes as shown by chunk F.

Afterwards, two things happen: a 7th change is made, and roughly at the same time, the change 908 is committed to the database. At that point, the subsequent indexer run (indicated by the 4th black rectangle on the "Indexer Runs" line) would encompass those two changes and produce a chunk that spans between them, as shown by chunk G.

Thus, there exists both the modification timeline and also the change timeline. The commit timeline dictates what appears to the indexer, and the indexer dictates the duration of time of chunks that are generated. Overlap in time can occur, as shown by Chunk F and Chunk G.

One purpose of the arrangement of FIG. 9 is to illustrate the length of time that passes between changes 908 and 924, due to the slowness to commit the change 908. The indexer makes sure to incorporate the change 908. This means that the time of creation of Chunk G may be longer, but the change 908 will not be overlooked. Thus, FIG. 9 solves the problem of overlooking changes that is illustrated in FIG. 8.

Figure 10:
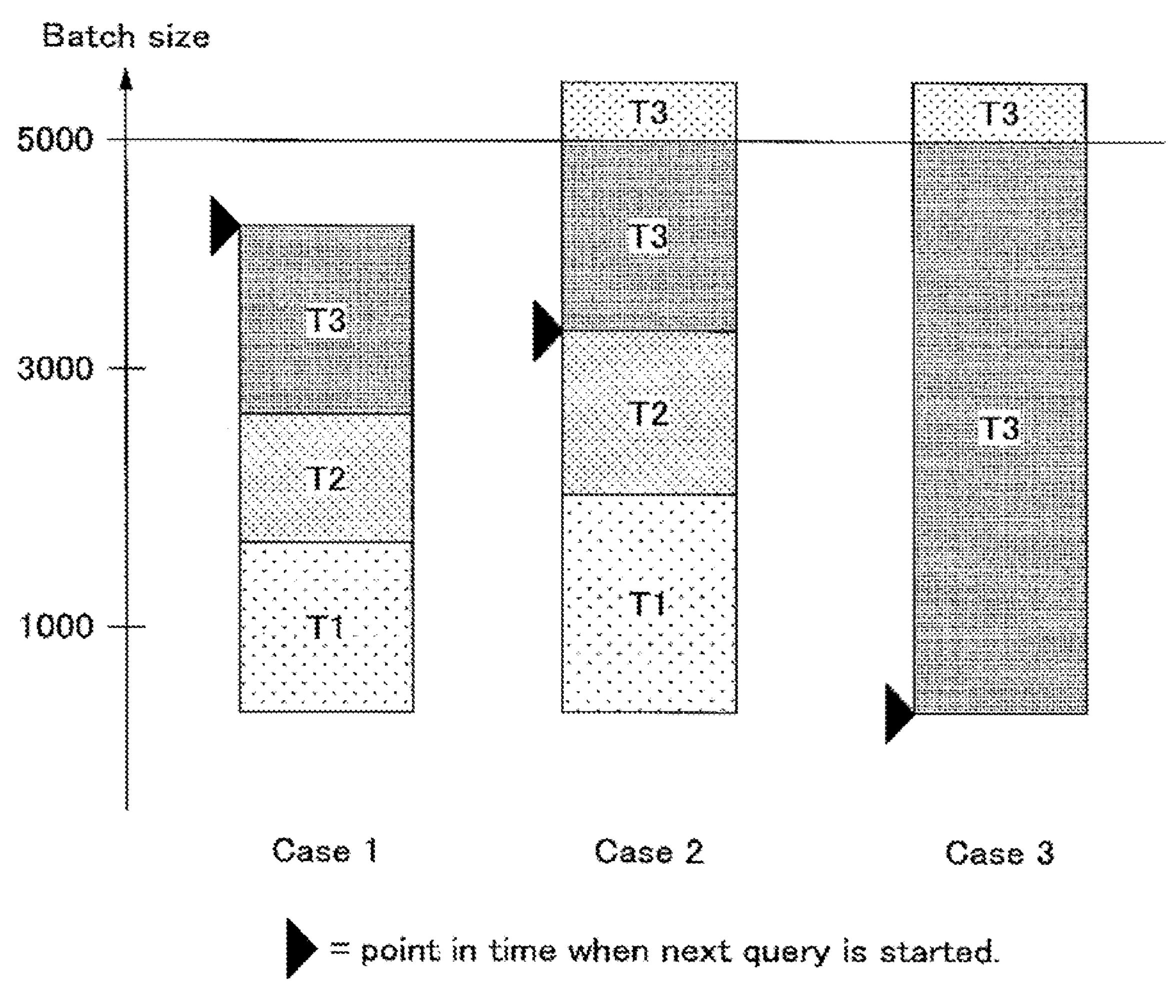
FIG. 10 shows a potential problem related to exceed a record limit.

Another issue handled by the environment disclosed herein is the case of single modstamps. A modstamp is similar to but not the same as a timestamp. A modstamp is a timestamp of a modification. When changes are packaged into chunks, it is desired to limit to the number of rows that will be covered by a chunk (for example, to 5000 records). Since the chunk is bounded by timestamps, a problem exists if more than 5000 records share the exact same timestamp. An example of this is shown in FIG. 10, using 3 cases.

In Case 1, the covered set of records is smaller than the row size limit, so that it is likely the resulting chunk covers every modification up to and including the end date of the query. Subsequent chunks can begin strictly after this date, using for example a query stating ("WHERE timestamp>T3").

In Case 2, if a set of 5000+ records containing multiple timestamps arrives, its not possible to know whether the last timestamp in the set has been exhausted yet. There could be more records with time T3 that haven't been seen. So, rather than issuing the next query with a begin date of "WHERE timestamp>T3", it is necessary to use "WHERE timestamp>T2", and keep T3 in the set. This could result in getting duplicates of some records already seen, but is a minor inefficiency.

The most significant potential problem is shown in Case 3, wherein every record in a full batch (e.g. ≥5000 records) has the same modstamp. For example, issuing a query "WHERE timestamp>T2" will never make progress, because it will always pull the same 5000 records with timestamp T3. To get around this, the environment 1110 detects this "single modstamp" condition and adds an additional criteria to the chunk metadata definitions, as shown in FIG. 3: a pair of entity IDs in the status table. These entity IDs are used further constrain the chunk. If these entity IDs are present, the modstamp boundaries of the chunk must be identical.

The absence of entity ID boundaries in the chunk means that it is simply time-bounded, and that the two timestamps (start and end) represent a range containing a discrete set of modified records.

Within normal operation of the environment 1110, the expectation (not guaranteed) is that the set of records represented contains more than one timestamp, and the count of contained records is less than or equal to a "max records per chunk" threshold. However, this can't be guaranteed, because for example of a potential long-running transaction problem. In such a case, a large series of updates with the same timestamp could always appear in the table in a place that's already covered by another non-single-modstamp chunk. This is an unlikely situation, but the environment 1110 thus includes an extra check (and repair mechanism) for this possibility.

It is possible that after a chunk is created, a later in-process transaction with a large number of rows may commit and thus escalate the chunk to being above the size limit. The chunk would either be served in its too-large state (which is not ideal but will work), or the chunk could be adjusted manually by updating the bounding conditions of the chunk. Regarding updating corrupted or invalid chunks, or even valid chunks, the embodiments disclosed herein include an automated software process that discovers problems with chunks and repairs them. One example solution is to delete the offending chunks, and re-enqeue the entire region for re-indexing.

Appendix: Selected Flags and Default Parameters

The following are examples of flags and parameters that can be set by a user or a developer.

ShouldContinueAfterFailure (default: true)

If set to "true", failures that happen during the client replication process won't halt the process, but will write to the log and attempt to continue (with the next chunk, or server, as appropriate). Setting this flag to "true" makes the system more robust and resilient to problems, at the expense of potentially missing data if nobody is watching the log. Ultimately, it should be set to "false" in production and all known errors should be handled correctly.

ShouldLeadersCacheLocalChunks (default: true)

If set to "true", instances that believe themselves to be the current leader will cache all chunks they produce locally. This should generally be true, because all local instances, plus all leaders in other data centers, will ask the leaders for their chunks independently, so serving from cache will be more efficient.

ShouldNonLeadersCacheLocalChunks (default: true)

If set to "true", instances that do not believe themselves to be the current leader will cache all chunks they produce locally. This should be true if local instances go directly to each other (as opposed to the local leader) for chunks, and the number of local instances is greater than 2. Otherwise, this may be wasted effort (if everyone asks the leader, even for local chunks, or if it's just the leader and one other instance). Such erroneous assumptions by an instance (either leader or not) are a tolerable side-effect of the continual designation and re-designation of new leaders. The embodiments described herein includes safeguards to manage the occasional erroneous assumption.

ShouldLeadersCacheAllChunks (default: true)

If set to "true", instances that believe themselves to be the current leader will cache all chunks, both those produced locally and those retrieved remotely. This should generally be true, because all local instances, plus all leaders in other data centers, will ask the leaders for all chunks, so serving from cache will be more efficient.

ShouldLookForLostChunks (default: false)

If set to "true", each iteration of the client will attempt to fetch and upsert not only the most recent chunks returned by the LIST command in this iteration, but also any prior active chunks that have yet to be upserted (for example due to a "server unavailable" error).

MaxRowsPerBatch: 3000

Default batch size, controlling how many records will be allowed in a single chunk. This also impacts single modstamp issues.

What is claimed is:

1. A method comprising:

monitoring, by a change detection thread running on a first server associated with a first instance of a plurality of instances of a replicated database, for changes to any of a plurality of records within one or more shared tables of the replicated database;

responsive to detection of a change to a record of the plurality of records, storing, by the change detection thread, an item onto a queue containing information regarding the change; and packaging groups of changes, represented by multiple items on the queue, into a plurality of chunks, wherein each chunk of the plurality of chunks:

corresponds to a discrete unit of progress for both change detection and transport;

is associated with a plurality of changed records;

contains metadata about the plurality of changed records, wherein the metadata includes timestamp boundaries indicative of the plurality of changed records associated with the chunk, and wherein the timestamp boundaries include a first timestamp indicating an earliest time at which the plurality of changed records was modified and a second timestamp indicating a latest time at which the plurality of changed records was modified; and does not contain data from the one or more shared tables; and wherein the timestamp boundaries of a first chunk of the plurality of chunks overlap the timestamp boundaries of a second chunk of the plurality of chunks.

2. The method of claim 1, wherein said packaging comprises:

periodically aggregating, by an indexer thread running on the first server, information regarding the plurality of changed records that have been committed since a previous execution of the indexer thread into a particular chunk of the plurality of chunks and initializing the metadata contained therein by pulling items from the queue; and completing, by a replication process running on the first server, the metadata based on a first changed record and a last changed record of the plurality of changed records and persisting the first chunk locally.

3. The method of claim 2, further comprising facilitating, by the first server, replication of changed records to a second instance of the plurality of instances by:

receiving, from a second server associated with the second instance, a first request for a set of chunks, wherein the request includes one or more specified conditions;

responsive to the first request, returning, to the second server, those of the plurality of chunks containing metadata satisfying the one or more specified conditions;

receiving, from the second server, a second request for underlying data for a particular chunk of the plurality of chunks; and responsive to the second request, returning, to the second server, the underlying data.

4. The method of claim 1, wherein the metadata includes an identifier of the first instance, an entity type associated with the plurality of changed records, information identifying a partition of the one or more shared tables affected by the plurality of changed records.

5. The method of claim 1, wherein the first timestamp of a first chunk of the plurality of chunks lies between the timestamp boundaries of the second chunk.

6. The method of claim 1, wherein the second timestamp of a first chunk of the plurality of chunks lies between the timestamp boundaries of the second chunk of the plurality of chunks.

7. The method of claim 1, wherein the timestamp boundaries of a first chunk of the plurality of chunks encompass the timestamp boundaries of the second chunk of the plurality of chunks.

8. The method of claim 1, wherein said overlap is as a result of one of the plurality of changed records associated with the second chunk committing after all of the plurality of changed records associated with the first chunk.

9. An article of manufacture comprising a non-transitory computer-readable medium having stored thereon instructions that, when executed by one or more processors of a server associated with a first instance of a plurality of instances of a replicated database, cause the one or more processors to:

monitor for changes to any of a plurality of records within one or more shared tables of the replicated database;

responsive to detection of a change to a record of the plurality of records, store an item onto a queue containing information regarding the change; and package groups of changes, represented by multiple items on the queue, into a plurality of chunks, wherein each chunk of the plurality of chunks:

corresponds to a discrete unit of progress for both change detection and transport;

is associated with a plurality of changed records;

contains metadata about the plurality of changed records, wherein the metadata includes timestamp boundaries indicative of the plurality of changed records associated with the chunk, and wherein the timestamp boundaries include a first timestamp indicating an earliest time at which the plurality of changed records was modified and a second timestamp indicating a latest time at which the plurality of changed records was modified; and does not contain data from the one or more shared tables; and wherein the timestamp boundaries of a first chunk of the plurality of chunks overlap the timestamp boundaries of a second chunk of the plurality of chunks.

10. The article of claim 9, wherein packaging the groups of changes comprises:

periodically aggregating, by an indexer thread, information regarding the plurality of changed records that have been committed since a previous execution of the indexer thread into a first chunk of the plurality of chunks and initializing the metadata contained therein by pulling items from the queue; and completing the metadata based on a first changed record and a last changed record of the plurality of changed records and persisting the first chunk locally.

11. The article of claim 10, wherein the instructions further cause the one or more processors to facilitate replication of changed records to a second instance of the plurality of instances by:

receiving, from a second server associated with the second instance, a first request for a set of chunks, wherein the request includes one or more specified conditions;

responsive to the first request, returning, to the second server, those of the plurality of chunks containing metadata satisfying the one or more specified conditions;

receiving, from the second server, a second request for underlying data for a particular chunk of the plurality of chunks; and responsive to the second request, returning, to the second server, the underlying data.

12. The article of claim 9, wherein the metadata includes an identifier of the first instance, an entity type associated with the plurality of changed records, information identifying a partition of the one or more shared tables affected by the plurality of changed records.

13. The article of claim 11, wherein the first timestamp of a first chunk of the plurality of chunks lies between the timestamp boundaries of the second chunk.

14. The article of claim 11, wherein the second timestamp of a first chunk of the plurality of chunks lies between the timestamp boundaries of the second chunk of the plurality of chunks.

15. The article of claim 11, wherein the timestamp boundaries of a first chunk of the plurality of chunks encompass the timestamp boundaries of the second chunk of the plurality of chunks.

16. The article of claim 11, wherein said overlap is as a result of one of the plurality of changed records associated with the second chunk committing after all of the plurality of changed records associated with the first chunk.

17. A system comprising:

a processor; and a non-transitory computer-readable medium, coupled to the processing resource, having stored therein instructions that when executed by the processor cause the processor to:

monitor for changes to any of a plurality of records within one or more shared tables of a first instance of a plurality of instances of a replicated database;

responsive to detection of a change to a record of the plurality of records, store an item onto a queue containing information regarding the change; and package groups of changes, represented by multiple items on the queue, into a plurality of chunks, wherein each chunk of the plurality of chunks:

corresponds to a discrete unit of progress for both change detection and transport;

is associated with a plurality of changed records;

contains metadata about the plurality of changed records, wherein the metadata includes timestamp boundaries indicative of the plurality of changed records associated with the chunk, and wherein the timestamp boundaries include a first timestamp indicating an earliest time at which the plurality of changed records was modified and a second timestamp indicating a latest time at which the plurality of changed records was modified; and does not contain data from the one or more shared tables;

wherein the timestamp boundaries of a first chunk of the plurality of chunks overlap the timestamp boundaries of a second chunk of the plurality of chunks; and wherein the overlap is as a result of a long-running transaction involving one of the plurality of changed records associated with the second chunk committing after all of the plurality of changed records associated with the first chunk.

18. The system of claim 17, wherein packaging the groups of changes comprises:

periodically aggregating, by an indexer thread, information regarding the plurality of changed records that have been committed since a previous execution of the indexer thread into a first chunk of the plurality of chunks and initializing the metadata contained therein by pulling items from the queue; and completing the metadata based on a first changed record and a last changed record of the plurality of changed records and persisting the first chunk locally.

19. The system of claim 18, wherein the instructions further cause the processor to facilitate replication of changed records to a second instance of the plurality of instances by:

receiving, from a second server associated with the second instance, a first request for a set of chunks, wherein the request includes one or more specified conditions;

responsive to the first request, returning, to the second server, those of the plurality of chunks containing metadata satisfying the one or more specified conditions;

receiving, from the second server, a second request for underlying data for a particular chunk of the plurality of chunks; and responsive to the second request, returning, to the second server, the underlying data.

20. The system of claim 17, wherein the metadata includes an identifier of the first instance, an entity type associated with the plurality of changed records, information identifying a partition of the one or more shared tables affected by the plurality of changed records.

* * * * *